(12) United States Patent
Oberhofer

(10) Patent No.: US 11,752,697 B2
(45) Date of Patent: Sep. 12, 2023

(54) DEVICE AND METHOD FOR MAKING A THREE-DIMENSIONAL OBJECT

(71) Applicant: EOS GmbH Electro Optical Systems, Krailing (DE)

(72) Inventor: Johann Oberhofer, Stockdorf (DE)

(73) Assignee: EOS GmbH Electro Optical Systems, Krailling (DE)

( * ) Notice: Subject to any disclaimer, the term of this patent is extended or adjusted under 35 U.S.C. 154(b) by 51 days.

(21) Appl. No.: 17/454,934

(22) Filed: Nov. 15, 2021

(65) Prior Publication Data

US 2022/0072615 A1 Mar. 10, 2022

Related U.S. Application Data

(63) Continuation of application No. 15/041,695, filed on Feb. 11, 2016, now abandoned.

(30) Foreign Application Priority Data

Feb. 18, 2015 (DE) .......................... 102015202964.6

(51) Int. Cl.
*B29C 64/295* (2017.01)
*B29C 64/268* (2017.01)
(Continued)

(52) U.S. Cl.
CPC ............ *B29C 64/295* (2017.08); *B22F 10/28* (2021.01); *B22F 10/36* (2021.01); *B22F 10/362* (2021.01);
(Continued)

(58) Field of Classification Search
CPC ......... B33Y 30/00; B33Y 40/00; B33Y 10/00; B33Y 70/00; B33Y 50/02; B33Y 80/00;
(Continued)

(56) References Cited

U.S. PATENT DOCUMENTS 5,393,482 A 2/1995 Benda et al.
5,508,489 A 4/1996 Benda et al.
(Continued)

FOREIGN PATENT DOCUMENTS

CN 101107882 1/2008
DE 102005048314 4/2007
(Continued)

OTHER PUBLICATIONS

J. Deckers et al., Additive Manufacturing of Ceramics, Journal of Ceramic Science and Technology, 05[04] 245-260 (2014).
(Continued)

*Primary Examiner* — Dana Ross
*Assistant Examiner* — Joe E Mills, Jr.
(74) *Attorney, Agent, or Firm* — Seyfarth Shaw LLP

(57) ABSTRACT

A device for the making of a three-dimensional object by means of layer by layer consolidation of a powderlike construction material by electromagnetic radiation or particle beam has a control unit that controls an irradiation device such that the powder particles of the construction material are bonded together at the sites where the radiation impinges on the construction material. A selective heating device is designed so that any given partial surface of the construction field can be heated before and/or after to a plateau temperature, which is significantly higher than the temperature of at least a portion of the construction field outside the partial surface. The control unit actuates the selective heating device such that the partial surface has a predefined minimum distance from the edge of the construction field.

19 Claims, 3 Drawing Sheets

(51) Int. Cl.
| | |
|---|---|
| B22F 10/28 | (2021.01) |
| B22F 12/13 | (2021.01) |
| B22F 12/90 | (2021.01) |
| B22F 10/36 | (2021.01) |
| B22F 10/362 | (2021.01) |
| B23K 26/144 | (2014.01) |
| B23K 26/342 | (2014.01) |
| B23K 26/00 | (2014.01) |
| C04B 35/64 | (2006.01) |
| B29C 64/153 | (2017.01) |
| B22F 12/20 | (2021.01) |
| B33Y 10/00 | (2015.01) |
| B33Y 30/00 | (2015.01) |

(52) U.S. Cl.
CPC .............. *B22F 12/13* (2021.01); *B22F 12/90* (2021.01); *B23K 26/0006* (2013.01); *B23K 26/144* (2015.10); *B23K 26/342* (2015.10); *B29C 64/268* (2017.08); *B22F 12/20* (2021.01); *B22F 2999/00* (2013.01); *B29C 64/153* (2017.08); *B33Y 10/00* (2014.12); *B33Y 30/00* (2014.12); *C04B 35/64* (2013.01); *Y02P 10/25* (2015.11)

(58) Field of Classification Search
CPC ............ B29C 67/0066; B29C 67/0051; B29C 67/0085; B29C 67/0077; B29C 67/0081; B29C 64/386; B29C 64/153; B29C 64/20; B29C 64/135; B29C 64/165; B29C 41/12; B29C 39/10; B22F 3/1055; B22F 2003/1056; B22F 2999/00; B22F 2203/11; B22F 2003/1057; B22F 12/90; B22F 12/20; B22F 12/13; B22F 10/36; B22F 10/362; B22F 10/28; B23K 26/0006; B23K 26/144; B23K 26/342; G03F 7/0037; G03F 7/70416; C04B 35/64; Y02P 10/25
USPC .................. 264/237; 219/121.66, 121.85
See application file for complete search history.

(56) References Cited

U.S. PATENT DOCUMENTS

| | | | |
|---|---|---|---|
| 6,007,764 | A | 12/1999 | Benda et al. |
| 8,502,107 | B2 | 8/2013 | Uckelmann |
| 10,336,008 | B2 * | 7/2019 | Perret .................... B22F 12/45 |
| 2004/0104499 | A1 | 6/2004 | Keller |
| 2005/0074550 | A1 | 4/2005 | Leuterer et al. |
| 2007/0196561 | A1 | 8/2007 | Philippi et al. |
| 2008/0131104 | A1 | 6/2008 | Philippi |
| 2009/0017220 | A1 | 1/2009 | Muller et al. |
| 2009/0295042 | A1 | 12/2009 | Pfister et al. |
| 2010/0007062 | A1 | 1/2010 | Larsson et al. |
| 2010/0161102 | A1 | 6/2010 | Mattes et al. |
| 2011/0165340 | A1 | 7/2011 | Baumann |
| 2011/0221099 | A1 | 9/2011 | Oberhofer et al. |
| 2014/0348692 | A1 | 11/2014 | Bessac et al. |
| 2015/0202826 | A1 | 7/2015 | Paternoster et al. |
| 2016/0016255 | A1 | 1/2016 | Bruck et al. |
| 2016/0144571 | A1 | 5/2016 | Philippi |

FOREIGN PATENT DOCUMENTS

| | | |
|---|---|---|
| DE | 102007024469 | 11/2008 |
| DE | 102012012344 | 9/2013 |
| DE | 2292357 | 4/2016 |
| EP | 1388411 | 7/2003 |
| EP | 1583626 | 7/2010 |
| EP | 2340925 | 1/2011 |
| EP | 2292357 | 3/2011 |
| EP | 2292357 A1 | 3/2011 |
| FR | 2984778 | 6/2013 |
| WO | 2006105827 | 10/2006 |
| WO | 2014012764 | 1/2014 |

OTHER PUBLICATIONS

P. Aggarangsi et al., Localized preheating approaches for reducing residual stress in additive manufacturing (2006), pp. 709-720.

Abe et al., The manufacturing of hard tools from metallic powders by selective laser melting, Journals of Materials Processing Technology 111 (2001) 210-213.

Rafi et al., Microstructures and Mechanical properties of Ti6Al4V Parts Fabricated by Selective Laser Melting and Electron Beam Melting, Journals of Materials Engineering and Performance—vol. 22(12) Dec. 2013.

Wilkes et al., Additive Manufacturing of ZrO2—Al2O3 ceramic components by selective laser melting, Rapid Prototyping Journal 1971 (2013) 51-57.

European Search Report, dated Jul. 25, 2016, 7 pages.

* cited by examiner

DEVICE AND METHOD FOR MAKING A THREE-DIMENSIONAL OBJECT

The present invention pertains to an additive manufacturing device and method, in particular a device and a method for the making of a three-dimensional object by means of selective layer by layer consolidation of powderlike construction material by means of the application of energy.

A method of this kind is used for example for Rapid Prototyping, Rapid Tooling or Rapid Manufacturing. An example of such a method is known under the name "selective laser sintering or laser melting". In this, powder is selectively consolidated by selective irradiation with a laser beam, in that the thermal energy introduced into the material by the laser beam is used to melt the material entirely or superficially so that the powder grains have joined together after the ensuing cooldown. Besides laser radiation, other electromagnetic radiation or also an electron beam for example can be used for the application of energy.

EP 1 583 626 B1 describes a device and a method by which objects are made with high precision, despite the rather fast manufacturing speed sought. In particular, when consolidating a layer of a powderlike construction material in order to generate a cross section of the object being produced, it is proposed to alternately aim the energy beam at different regions of the cross section of the object. In particular, during the manufacturing process the powder layer to be consolidated is recorded by means of a thermal imaging camera and after an analysis of the temperature distribution in the powder layer the temperature is specifically corrected at individual places in the powder layer. The computations required for this to determine the nature and manner of propagation of thermal energy after the energy input by the energy beam make the method relatively complicated, however.

Stresses which are supposed to be reduced by the method in EP 1 583 626 B1 occur in objects manufactured by means of a generative layered construction method especially when the temperature of the powder layer, before the energy beam impinges on it, lies substantially below the temperature at which a consolidation of the powderlike material takes place by the fusing thereof. Thus, such stress problems occur in particular, but not only, with metallic powder materials.

Therefore the problem which the present invention proposes to solve is that of providing an improved device and an improved method for the making of three-dimensional objects. It should be possible to produce stress-free parts preferably in the simplest possible manner.

A device according to the invention for the making of a three-dimensional object by means of layer by layer consolidation of a powderlike construction material by electromagnetic radiation or particle beam contains: a height-adjustable carrier, on which the object is built, and whose horizontal dimension defines a construction field, an irradiation device for directing the electromagnetic radiation or particle radiation onto regions of an applied layer of the construction material within the construction field corresponding to an object cross section, and a control unit for controlling the irradiation device such that the powder particles of the construction material are bonded together at the sites where the electromagnetic radiation or particle radiation impinges on the construction material. In particular, a selective heating device is present, which is designed so that any given partial surface of the construction field can be heated to a plateau temperature. The plateau temperature is significantly higher than the temperature of at least a portion of the construction field outside the partial surface.

The control unit is further designed so that it controls the selective heating device such that the partial surface has a predefined minimum distance d from the edge of the construction field.

In such a device, it is not the entire construction field that needs to be brought up to a high temperature in order to decrease the temperature difference between the fused material and its surrounding, especially the surrounding unconsolidated powder material, and consequently reduce stress cracks. Instead, by a minimum distance from the edge of the construction field the device is protected against the high temperatures in that the unconsolidated powderlike construction material surrounding an object being produced serves as an insulator. Furthermore, a powder layer in the construction field can be heated selectively, i.e., only at selected sites.

The plateau temperature can be, e.g., a temperature of the unconsolidated construction material immediately prior to supplying the energy for its consolidation. Furthermore, the plateau temperature can also be a temperature which is adjusted so that an already consolidated object cross section only cools down slowly. Preferably, the plateau temperature is at most 200° C., especially preferably at most 150° C. and very specially preferably at most 100° C. less than an activation temperature of the construction material, i.e., a temperature at which the powder particles are bonded together by modification of the chemical and/or physical properties of the powder so that a solid results after a cooling. Due to the preheating of the construction material to the plateau temperature as close as possible to the activation temperature, the energy put in by the irradiation device is used extensively for the actual consolidation process and not so much for the preheating of the powder. In this way, the consolidation process can occur in an overall more controlled manner.

Preferably, the control unit has a data storage medium, in which material parameter values with regard to a thermal behaviour of at least one construction material, preferably various construction materials, are stored. This makes it possible in particular to control the heating process in dependence on the construction material used in the device. Further preferably, the control unit in operation, i.e., during the manufacturing process, establishes the minimum distance d from the edge of the construction field in dependence on the material parameter values stored in the data storage medium for the construction material being used. In this way, it is possible to set the minimum distance from the edge of the construction field in dependence on the respective insulating properties of a quantity of the unconsolidated construction material surrounding the object being produced.

Generally in the context of the invention the minimum distance from the edge of the construction field should be kept as small as possible so as not to needlessly block space in the construction field. On the other hand, this minimum distance should be adequately dimensioned to protect other regions of the device from damage due to overly high temperature stress.

Preferably, the control unit in operation establishes the shape of a partial surface to be selectively heated, inter alia its shape and/or dimensions, in dependence on the shape of the object cross section to be consolidated. In this way, the surface of the powder layer to be heated by means of the selective heating device can be especially effectively limited to the absolutely necessary degree, which improves the energy efficiency.

Moreover, the control unit in operation preferably establishes a partial surface such that its area extent is greater than that of the object cross section to be consolidated. In this way, not only an object cross section to be consolidated, but also a portion of the powder surrounding it is heated, so that the heat dissipation from the sites being consolidated at the edge of the object cross section is lessened. This likewise leads to a reduction of thermal stresses and/or prevents an inadequate consolidation of the powder at the edge of the object cross section.

In one preferred embodiment of the invention, the selective heating device in operation directs electromagnetic radiation, especially laser radiation, and/or particle radiation onto the surface of the construction material. In this way, a selective heating of the construction material can occur without the use of complicated added structures, such as heating hoses or heating resistors. Furthermore, the heating can occur with high position selectivity. Especially when laser radiation is used for the selective heating and this laser radiation has the same wavelength as that of the irradiation device, if the latter also uses a laser, one can take the laser radiation for the selective heating from the same laser source as is used to generate the consolidation radiation.

Preferably the construction field is surrounded by a container, and in addition a cooling and/or heating device is also present for the cooling and/or heating of the container. Due to a heating of the container, heat can be supplied additionally to the powderlike construction material, so that the selective heating device can be smaller in dimension. By a cooling of the container surrounding the construction field, heat can be deliberately taken away and the parts of the device surrounding the container can be protected against the heat in the construction field. Due to the cooling, stationary thermal conditions in particular can be established in the surrounding of the container, by cooling down a container wall to a given temperature value. Furthermore, due to a suitable cooling it is possible to reduce the aforementioned minimum distance from the edge of the construction field. Such a reduction will be effected preferably in dependence on the determined (i.e., measured or calculated) cooling parameter values of the cooling.

The device for making a three-dimensional object can also have a temperature measuring device, which performs a temperature measurement at least in a partial region of the construction field, preferably near its edge. Preferably, the control unit can then control the heat supply by the selective heating device during the manufacturing process such that a minimum plateau temperature to which a partial surface of the construction field is heated lies in at least one operating state (i.e., not necessarily during the entire manufacturing process in one layer, but rather as needed, even temporarily) above a temperature relayed by the temperature measuring device to the control unit by a predefined amount.

By the monitoring of the temperature, the heating of the construction material by means of the selective heating device can be specifically adapted to the particular conditions in the device at a given time. In particular, the control unit too can control the selective heating device such that the partial surface is heated to a minimum plateau temperature which lies at least 300° C., preferably at least 400° C., especially preferably at least 800° C. above the temperature relayed by the temperature measuring device to the control unit. In this way, depending on the construction material used, the plateau temperature can be set to be as close as possible to the activation temperature.

Preferably, the control unit controls the selective heating device such that the latter heats a partial surface of the construction field at least to the plateau temperature before and/or after the directing of the electromagnetic radiation or particle radiation of the irradiation device onto the construction material. In this way, the heating process of the construction material and/or the cooldown process after its consolidation can occur in a more controlled manner. Without the selective heating, temperature changes in the powderlike construction material as the irradiation device sweeps over the construction field are more abrupt and larger.

In particular, the control unit can control the selective heating device so that it heats a partial surface of the construction field after the directing of the electromagnetic radiation or particle radiation of the irradiation device onto the construction material such that a cooldown rate in the partial surface is at least 30%, preferably at least 50%, especially preferably at least 70% less than without the action of the selective heating device. By means of a device designed in this way it is possible to delay the cooldown process after the consolidation of the powder, which serves in particular to prevent stress cracks.

With a device according to the invention, a method for making a three-dimensional object by means of a layer by layer consolidation of a powderlike construction material by electromagnetic radiation or particle radiation is possible, wherein an object is built on a height-adjustable carrier, whose horizontal dimension defines a construction field, and electromagnetic radiation or particle radiation is directed with the aid of an irradiation device onto regions of a deposited layer of the construction material within the construction field corresponding to an object cross section, wherein the irradiation device is controlled with a control unit such that the powder particles of the construction material are bonded together at the sites where the electromagnetic radiation or particle beam impinges on the construction material. In particular, with a selective heating device, any given partial surface of the construction field is heated to a plateau temperature, wherein the plateau temperature is significantly higher than a temperature of at least a portion of the construction field present outside the partial surface. Here, the control unit controls the selective heating device such that the partial surface has a predefined minimum distance d from the edge of the construction field.

In particular, the minimum distance d can be established in dependence on preliminary experiments in which the heat transmission ability of the construction material used in the process is determined. In this way, the heating of the construction material can be adapted specifically to the construction material being used with its characteristic thermal properties.

Further features and purposes of the invention will emerge from the description of exemplary embodiments with the help of the appended drawings.

Figure 1:
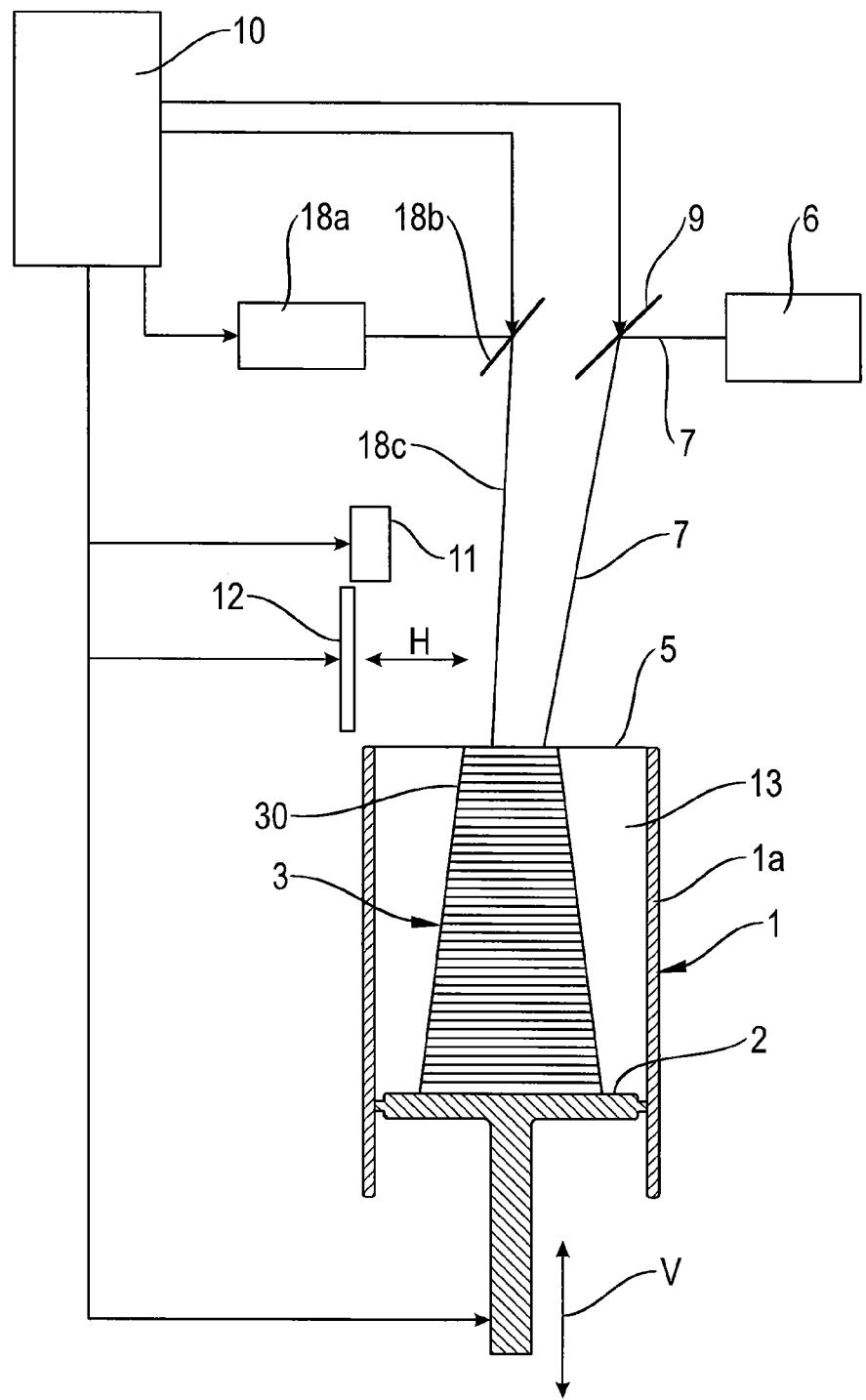
FIG. 1 is a schematic, partly sectioned view of an exemplary embodiment of a device according to the invention for the layer by layer making of a three-dimensional object which is suitable for carrying out a method according to the invention.

In the following, making reference to FIG. 1, an example of a device 100 according to the invention is described, being suited to carrying out a method according to the invention. In the device 100, an object 3 is built up in a container 1 open at the top, having a wall 1a. In the container 1 there is arranged a carrier which can move in a vertical direction V, whose schematically depicted carrier plate 2 closes off the container 1 at the bottom and thus forms its bottom. Not shown in the figure is a construction platform which may also be present between the lowermost layer of the object 3 and the carrier plate 2. In FIG. 1, the object 3 being built in the container 1 is shown in an intermediate state with several cross sections 30 already consolidated, wherein the object 3 is surrounded by powderlike construction material 13 remaining unconsolidated, and represented as transparent in the figure.

The device 100 furthermore contains a supply tank 11 for a powderlike construction material which can be consolidated by electromagnetic radiation or particle radiation and an applicator 12, able to move in a horizontal direction H, for the application of a layer of the construction material onto the most recently consolidated object cross section 30 and the unconsolidated construction material surrounding it within a construction field 5, which is bounded by the container wall 1a. The device 100 furthermore contains an irradiation device in the form of a first radiation source 6, such as a laser, which generates a laser beam 7, which is directed via a deflection device 9 onto a layer of unconsolidated construction material previously deposited by the applicator 12. In addition, a selective heating device 18a, 18b is provided, which is formed for example from a second radiation source 18a together with another deflection device 18b. The second radiation source 18a can emit a heating beam 18c, for example, which can be deflected by means of the deflection device 18b onto any given partial surfaces 19 of the construction field 5 (see FIG. 2), which is bounded by the container wall 1a.

The second radiation source 18a can either generate electromagnetic radiation, i.e., it can be a laser in particular, or it can generate particle radiation (such as electrons). In the latter case, the deflection device 18b would be an ion optics. If the heating beam 18c is a laser beam, the second radiation source 18a can optionally be omitted and in its place the first radiation source 6 can be used to generate the heating beam 18c. For this, the light intensity is then expediently reduced by means of a supplemental optics not shown in FIG. 1 as compared to the light intensity of the consolidation beam 7. Alternatively or in addition, the quantity of heat introduced with the heating beam 18c can also be adjusted via the speed with which it is moved across the deposited layer of the construction material.

Furthermore, the device 100 contains a control unit 10, by which the individual components of the device 100 are controlled in coordinated fashion to carry out the construction process. The control unit can contain a CPU, whose operation is controlled by a computer program (software). The computer program can be stored separately from the device on a storage medium, from which it can be loaded into the device, especially into the control unit 10.

The deflection device 18b is designed so that the heating beam 18c of the second radiation source 18a can be deflected onto any given regions of the construction field 5, in particular can be directed only onto one or more partial surfaces 19 thereof, wherein the total area of all partial surfaces 19 and in particular the area of a partial surface 19 is less than the area of the construction field 5. In particular, the control device 10 can be used to adjust the introduced thermal energy by altering the power density at the point of impingement of the heating beam 18c on the construction field 5 and/or by altering the scanning speed of the heating beam 18c. The heating device 18a is dimensioned such that, possibly by sufficient focusing of the heating beam 18c and/or a sufficiently slow movement of the heating beam 18c across the construction field 5, at least so much energy can be introduced into the uppermost powder layer possibly consolidated already in portions thereof that the temperature at the point of impingement of the heating beam 18c is significantly higher than in other regions of the construction field 5. By "significantly higher" it is preferably meant that the temperature of the powderlike construction material at the point of impingement of the heating beam 18c is at least 300° C., preferably at least 400° C. and in some cases at least 800° C. above the temperature of the construction material in regions of the construction field 5 where no object cross section of the object to be made is situated, as a rule in a margin region of the construction field 5.

Activation temperature here means a temperature at which the powder particles bond together as a result of a chemical and/or physical change in their properties, for example in that the powder particles fuse entirely or only fuse superficially and sinter together. The activation temperature is thus a limit temperature at which the construction material is substantially modified in its chemical and/or physical structure.

Figure 2:
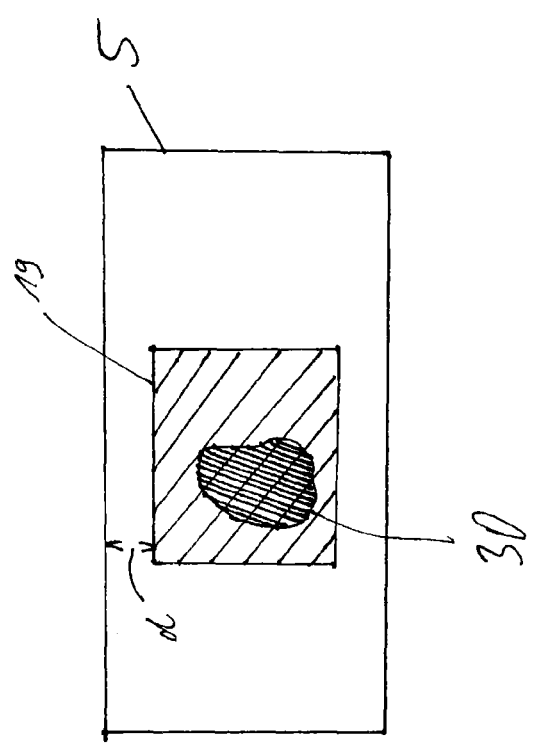
FIG. 2 is a top view of the construction field of the device from FIG. 1, showing as an example an object cross section currently being consolidated.

Furthermore, the control software in the control device 10 controls the heating beam 18c such that the point of impingement of the heating beam onto the construction field 5 always has a minimum distance d from the edge of the construction field 5. This situation is shown in FIG. 2. Here, within the construction field 5 there is shown an object cross section 30 being consolidated, which is covered by a partial surface 19, in which a heating of the construction material by means of the heating beam 18c occurs. As can be seen, the edge of the partial surface 19 has a minimum distance d from the edge of the construction field 5.

In order to reduce stresses in the object being made, a heating of a partial surface to a plateau temperature as close as possible to the activation temperature is preferably sought, i.e. for example to a plateau temperature which is at most 200° C., more preferably at most 150° C. and especially preferably at most 100° C. lower than an activation temperature of the construction material (11). However, the following points speak against a heating to too high a temperature:

- The temperature should not be so high that a consolidation of the powder material takes place.
- The higher the temperature, the more energy-consuming the heating process is.
- The higher the temperature, the greater is the heat dissipation to the edges of the construction field 5 and a possible harmful impact on the other parts of the device for layer by layer generative manufacturing, in FIG. 1 the laser sintering or melting device.

By taking account of the heat dissipating properties of the particular construction material used, one can specifically establish the plateau temperature to which the powderlike construction material needs to be preheated. This is because the better the heat supplied by the consolidation beam 7 is dissipated by the construction material, the harder it is to bring about a consolidation with the consolidation beam 7. Thus, the better the heat dissipation properties of the construction material, the closer the plateau temperature should be to the activation temperature.

The minimum distance d to the edge of the construction field 5 is also influenced by the heat transmission properties of the powder. As already mentioned above, the powder within this distance shall ensure an insulation toward the outside of the construction field 50. Thus, the better the heat transmission properties of the unconsolidated powderlike construction material, the greater the minimum distance d should be chosen.

In one particular embodiment, the control unit 10 has a data storage, in which material parameter values regarding the heat transmission properties of the construction material to be used in a planned production of one or more objects are stored. Then, during a manufacturing process, the control unit 10 can carry out the controlling of the selective heating device 18a, 18b in consideration of these material parameter values.

Ideally, material parameters or material parameter values regarding a plurality of construction materials will be stored in the data storage, so that prior to the start of a construction process the control unit 10 only needs to be informed as to the type of construction material being used.

In one advantageous embodiment of the invention, prior to a manufacturing process for objects with the device 100 the heat transmission ability of the construction material is determined in pre-tests so that it can be used for determining (establishing) the plateau temperature and the minimum distance d.

For the determination of the thermal conductivity of powderlike materials, first of all one can use the needle probe method of ASTM D5334-08. Here, a thin, elongated heating source (the needle probe) is inserted into a powder bed and heated with constant power. At the same time, the temperature inside the source is recorded. The slower the rise in the source temperature, the higher the thermal conductivity of the sample material.

Figure 3:
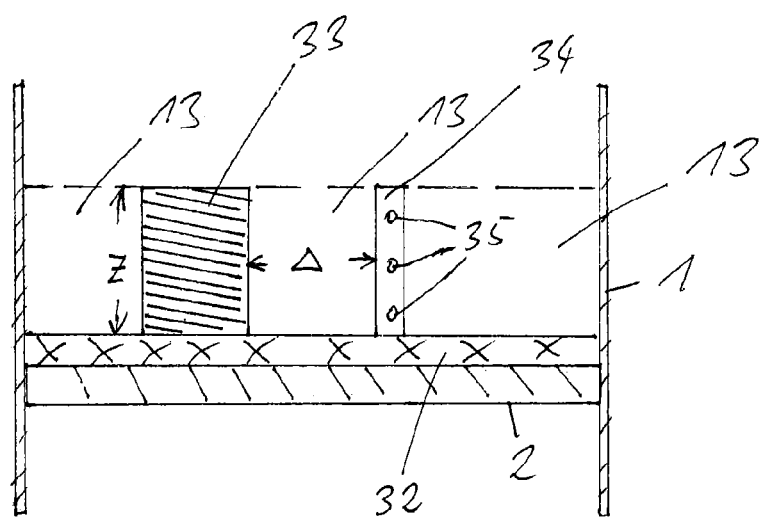
FIG. 3 illustrates a preliminary experiment to determine the heat transmission behaviour of the powderlike construction material.

Alternatively or in addition to the aforementioned method, the heat transmission ability of the construction material can be determined with the following preliminary experiment described in regard to FIG. 3. FIG. 3 shows in magnified view the container 1 of the device 100 along with the carrier plate 2 arranged in it. On this carrier plate 2 is placed a heat-insulating base 32, on which a heating cylinder 33 and a measuring stick 34 having a defined distance A from the heating cylinder 33 are arranged. For the preliminary experiment, the entire container 1 is filled with construction material 13 up to a filling height Z, coinciding with the height of the heating cylinder 33. Next, the heating cylinder 33 is preheated, for example by inductive heating, to a temperature $T_V$ which is 100° C., for example, below the desired activation temperature for the construction material 13 in the actual construction process to follow. Of course, a different temperature $T_V$ can also be used, but the closer the temperature $T_V$ to the activation temperature, the more precise the findings of the preliminary experiment are as to the actual heat transfer capacity of the construction material that is present during the actual construction process.

In the measuring stick 34 there are temperature detection elements 35 arranged at various heights. In FIG. 3 precisely three of these elements are shown, but one can also use any given other number of temperature detection elements. After the end of the heating process to the temperature $T_V$ of the measuring cylinder 33, the temperature detection elements 35 are used to detect the temperature in dependence on the time. The time change in the temperature is dependent on the heat transmission properties of the construction material 13 in the space with the distance A between the measuring stick 34 and the heating cylinder 33.

For an even more precise measurement of the heat transmission properties of the powder 13, a plurality of measuring sticks 34 can also be arranged at various distances $\Delta_1 \ldots \Delta_n$ from the heating element 33. The heating element 33 for example can be a cylinder, whose height essentially agrees with the height of the most massive object being made in the subsequent construction process, or whose diameter essentially agrees with the maximum diameter parallel to the carrier plate 2 of the most massive object being made in the subsequent construction process.

Alternatively or in addition to the preliminary experiments just described, the thermal conductivity of the construction material can also be determined during the manufacturing process of objects.

For this, the temperature of the uppermost powder layer is measured at different sites by means of a thermal imaging camera (IR camera) or a point pyrometer whose detection surface is moved across the uppermost powder layer. Since one knows at which points of the powder layer a consolidation is being carried out with the consolidation beam 7 and/or a preheating is being carried out with the heating beam 18c, one can use the distances between the points of the powder layer where the temperature was determined and the sites of the powder layer where energy is being supplied to obtain information about the heat transfer capacity of the powder.

Otherwise, one can also specifically determine the temperature at one or more sites in the construction field 5 with the thermal imaging camera or the point pyrometer and adapt the heating power to the locally present temperature in the target region 19 for the selective heating.

By measuring the temperature at one or more sites at a reference location in the construction field 5, preferably near the edge of the construction field 5 at a position where no powder is being consolidated in any layer, one can also adapt the minimum distance d from the construction field margin in dependence on the measured values found. In this way, in particular, the region outside the construction field 5 can be protected against damage from too large a temperature rise. But the temperature at the reference location can also be used alternatively or additionally for the control of the heat supply to the at least one partial surface 19 by the selective heating device, so that a minimum plateau temperature to which the partial surface 19 of the construction field 5 is heated is a predetermined amount above a temperature relayed by the temperature measuring device to the control unit 10. The minimum plateau temperature is preferably at least 300° C., more preferably at least 400° C., especially preferably at least 800° C. above the temperature relayed by the temperature measuring device to the control unit 10.

Optionally, the container, preferably the container wall, can be provided with a heating and/or cooling device (not shown). A heating device in this place enables an additional heating of the construction material, so that not as much heat needs to be supplied by the heating beam 18c. A cooling device in the wall of the container 1 means that the temperature outside the container 1 is prevented from rising to excessively high values. If one matches the heating power of the heating beam 18c, the minimum distance d and the cooling power of the cooling for the container to each other, one can achieve a stationary temperature distribution.

Although in the preceding discussion a laser sintering device or laser melting device has been described in detail, the invention can also be applied to other devices for the making of three-dimensional objects by means of the action of an energy beam for the consolidation of a powderlike construction material. For example, the energy for consolidating the powder can also be introduced by a two-dimensional radiation source, such as an infrared heater. In addition, it is also possible to use a plurality of radiation sources for the consolidation.

Moreover, one is not limited to electromagnetic radiation as the radiation for the consolidation of the construction material. Instead, it is also possible to use particle radiation, such as an electron beam.

Even though we have constantly spoken of a heating beam in the above, it is also possible not to supply the preheating energy in a partial surface 19 of the construction field 5 by sweeping a beam across the partial surface 19. Instead the preheating energy may be supplied by a two-dimensional irradiation of the at least one partial surface 19 or by sweeping across the at least one partial surface 19 with a beam action zone that is not pointlike, but instead has a predetermined lateral dimension and shape. For example, the partial surface 19 can be scanned with an infrared radiator. One must distinguish this from the two-dimensional heating systems known in the prior art, which can be used to heat the powderlike construction material in the entire construction field, but can only achieve an insignificant temperature rise in a freshly applied powder layer.

The supplying of energy with the heating beam can occur not only before the beginning of a consolidation process in a deposited powder layer, but also at the same time as the consolidation process. Furthermore, it is possible to irradiate such partial surfaces 19 of a deposited powder layer with the selective heating device, which are distinguished in that already selectively consolidated powder material is present in powder layers lying underneath them. In this way, one avoids too rapid a lowering of the temperature of the consolidated construction material. This prevents cracks due to too fast a cooldown of the already consolidated powder material and thus too rapid a cooldown of parts of an already consolidated object cross section. Preferably, the goal of the heating with the selective heating device is to make a cooldown rate in the partial surface(s) 19 at least 30%, preferably at least 50%, especially preferably at least 70% less than it would be without the action of the selective heating device 18a, 18b.

As in the prior art, the entire powder layer within the construction field 5 can be preheated additionally with a nonselective two-dimensional heating to a start temperature of, for example, 150° C.

Although this was not explicitly mentioned above in the description of the exemplary embodiments, it is not only possible to make one object in a manufacturing process, but also several objects can be made in parallel in the container 1. Where an object is mentioned above, such in a selective heating of an object cross section, such procedure can also be applied to all other objects being made in the manufacturing process. For example, if several object cross sections are present in a powder layer, the powder is selectively heated in the regions of several, preferably all, object cross sections.

As emerges from what has been said thus far, a selective heating makes sense preferably in those partial surfaces 19 which are almost identical to the object cross section(s) to be consolidated in a freshly deposited powder layer. Likewise, the selective heating can be limited to parts of the object cross section/object cross sections in which the most intense stresses are expected. One recognizes that the partial surfaces 19 to be heated with the selective heating device will preferably vary from one layer to another. Furthermore, it should be noted that different partial surfaces 19 in a freshly deposited layer (not necessarily assigned to the cross sections of different objects) do not necessarily have to be brought to the same plateau temperature.

In another possible embodiment, a selective heating of partial surfaces 19 of a deposited powder layer is effected such that around each selectively heated partial surface 19 there is a nonselectively heated powder layer, having at least a lateral dimension d perpendicular to the edge of the partial surface 19. In this way, an insulating region of thickness d of nonconsolidated powder is created around each selectively heated partial surface 19. With this technique, it is possible to lessen the mutual thermal influencing of partial surfaces 19, for example when several objects are being made in parallel. As a result, the manufacturing process can be effected in more controlled fashion.

The method according to the invention and the device according to the invention are especially suited to metallic construction materials. But in addition to this, the method according to the invention also brings benefits when other construction materials are used, such as ceramic or plastic powders, especially a PAEK powder.

The invention claimed is:

1. A device for the making of a three-dimensional object by a layer by layer consolidation process that melts or fuses a powder construction material by electromagnetic radiation or particle radiation comprising:
   a height-adjustable carrier upon which the three-dimensional object is built having a horizontal dimension that defines a construction field and a defined border edge which contains powder construction material within the construction field;
   an irradiation device for directing the electromagnetic radiation or particle radiation onto regions of an applied layer of the powder construction material within the construction field that corresponds to an object cross section;
   a control unit for controlling the irradiation device such that the powder construction material are bonded together at the sites where the electromagnetic radiation or particle radiation impinges on the powder construction material; and
   a selective heating device that is directed by the control unit to heat a heat dissipation area that encompasses the object cross section of a layer to a plateau temperature, the plateau temperature being lower than a melt or fusion point of the powder construction material and higher than a temperature of unconsolidated powder construction material in the construction field outside the heat dissipation area, the heat dissipation area having a predetermined boundary in operation of the selective heating device that is stored within a data storage, the boundary being spaced inboard from the defined border edge of the construction field, thereby reducing heat transfer between the impingement of the irradiation device and the construction field outside the heat dissipation area.

2. The device according to claim 1, wherein the plateau temperature is at most 200° C. less than an activation temperature of the powder construction material.

3. The device according to claim 1, wherein the control unit includes the data storage, in which material parameter values with regard to a thermal behaviour of the powder construction material are stored.

4. The device according to claim 3, wherein the boundary of the heat dissipation area is established in dependence on pretests in which a heat transmission ability of the powder construction material is determined by introducing a source of heat into powder construction material within the construction field at a point spaced inboard from the defined border edge and measuring temperatures at one or more reference locations in the construction field including near the defined border edge.

5. The device according to claim 1, wherein the control unit in operation establishes a shape of the defined border edge in dependence on a shape of the object cross section to be consolidated.

6. The device according to claim 1, wherein the control unit in operation establishes the defined border edge such that its area extent is greater than that of the object cross section to be consolidated.

7. The device according to claim 1, wherein the selective heating device in operation directs electromagnetic radiation onto a surface of the powder construction material.

8. The device according to claim 7, wherein the irradiation device directs laser radiation onto the surface of the powder construction material and the laser radiation of the selective heating device has a same wavelength as a wavelength of the irradiation device.

9. The device according to claim 1, further comprising:
a container surrounding the construction field; and
a cooling and/or heating device for the cooling and/or heating of the container.

10. The device according to claim 1, further comprising a temperature measuring device, wherein the control unit in operation controls heat supply by the selective heating device so that a minimum plateau temperature is above a temperature relayed by the temperature measuring device to the control unit by a predetermined amount.

11. The device according to claim 10, wherein the control unit controls the selective heating device so that the minimum plateau temperature lies at least 300° C. above the temperature relayed by the temperature measuring device.

12. The device according to claim 1, wherein the control unit actuates the selective heating device so that the selective heating device heats a partial surface of the construction field within the defined border edge after directing of the electromagnetic radiation or particle radiation onto the powder construction material by the irradiation device such that a cooldown rate in the partial surface is at least 30% less than without an action of the selective heating device.

13. A method for making a three-dimensional object by a layer by layer consolidation process that melts or fuses a powder construction material by electromagnetic radiation or particle radiation supplied by an irradiation device in an additive manufacture apparatus the apparatus including a height-adjustable carrier upon which the three-dimensional object is built, having a horizontal dimension that defines a construction field and a defined border edge which contains powder construction material within the construction field, the method comprising:
directing the electromagnetic radiation or particle radiation with the irradiation device onto regions of a deposited layer of the powder construction material within the construction field that correspond to an object cross section, such that the powder construction material is bonded together at the sites where the electromagnetic radiation or particle radiation impinges on the powder construction material;
providing a selective heating device, and directing the selective heating device to heat a heat dissipation area which encompasses the object cross section of a layer to a plateau temperature, the plateau temperature being lower than a melt or fusion point of the powder construction material and higher than a temperature of unconsolidated powder construction material in the construction field outside the heat dissipation area, the heat dissipation area having a predetermined boundary in operation of the selective heating device that is stored within a data storage of the additive manufacturing apparatus prior to a start of the method for manufacturing a three-dimensional object, the boundary being spaced inboard from the defined border edge of the construction field, thereby reducing heat transfer between the impingement of the irradiation device and the construction field outside the heat dissipation area.

14. The method according to claim 13, wherein the boundary of the heat dissipation area is established in dependence on pretests in which a heat transmission ability of the construction material used in the method is determined by introducing a source of heat into powder construction material within the construction field at a point spaced inboard from the defined border edge and measuring temperatures at one or more reference locations in the construction field including near the defined border edge.

15. The method according to claim 13, wherein the control unit actuates the selective heating device so that the selective heating device heats a partial surface of the construction field within the defined border edge at least to the plateau temperature before and/or after the directing of the electromagnetic radiation or particle radiation onto the construction material by the irradiation device wherein the partial surface has a predefined minimum distance from the edge of the construction field.

16. The method according to claim 13, further including a CPU having a data storage, in which material parameter values with regard to a thermal behaviour of at least one construction material are stored, and wherein the predetermined boundary is spaced a distance d according to the following algorithm:
identifying a default distance d stored in the data storage; and
increasing the distance d if a heat transmissibility of the powder construction material stored in the data storage is above a predetermined threshold, and decreasing the distance d if the heat transmissibility of the powder construction material stored in the data storage is below the predetermined threshold.

17. The method according to claim 13, wherein a heat transmission ability of the construction material is determined using a method of ASTM D5334-08.

18. A method for making a three-dimensional object by a layer by layer consolidation process that melts or fuses a powder construction material by electromagnetic radiation or particle radiation supplied by an irradiation device in an additive manufacture apparatus, the apparatus including a construction field having a build area therein in which the three-dimensional object is built by consolidation of consecutive layers corresponding to cross-sections of the object being built, the construction field having a defined border edge which contains powder construction material within the construction field, the method comprising:
directing the electromagnetic radiation or particle radiation with the irradiation device onto regions of a deposited layer of the powder construction material within the construction field that correspond to an object cross section, such that the powder construction material is bonded together at the sites where the electromagnetic radiation or particle radiation impinges on the powder construction material;
providing a selective heating device, and directing the selective heating device to heat a heat dissipation area which encompasses the object cross section of a layer to a plateau temperature, the plateau temperature being lower than a melt or fusion point of the powder construction material and higher than a temperature of unconsolidated powder construction material in the construction field outside the heat dissipation area;

determining a predetermined perimeter for the heat dissipation area based upon heat transmission data established prior to operation of the build process, the perimeter being spaced inboard from the defined border edge of the construction field;

operating the selective heating device to locate the predetermined perimeter a desired distance from the defined border edge so as to thereby reduce heat transfer between the impingement of the irradiation device and the construction field outside the heat dissipation area; and building the three-dimensional object layer by layer.

19. The method of claim 18, further including measuring temperature of unconsolidated powder material outside of the predetermined perimeter during the build process, and operating the selective heating device to establish a plateau temperature that is at least about 300 degree Centigrade above the measured temperature.

* * * * *